(12) United States Patent
Yang

(10) Patent No.: US 11,343,016 B2
(45) Date of Patent: May 24, 2022

(54) MEASUREMENT RESOURCE INDICATION METHOD AND RELATED DEVICE

(71) Applicant: GUANGDONG OPPO MOBILE TELECOMMUNICATIONS CORP., LTD., Guangdong (CN)

(72) Inventor: Ning Yang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 86 days.

(21) Appl. No.: 16/763,895

(22) PCT Filed: Nov. 16, 2017

(86) PCT No.: PCT/CN2017/111365
§ 371 (c)(1),
(2) Date: May 13, 2020

(87) PCT Pub. No.: WO2019/095208
PCT Pub. Date: May 23, 2019

(65) Prior Publication Data
US 2020/0343996 A1 Oct. 29, 2020

(51) Int. Cl.
*H04L 1/00* (2006.01)
(52) U.S. Cl.
CPC ................... *H04L 1/0026* (2013.01)
(58) Field of Classification Search
CPC .......................................... H04L 1/0026–0038
See application file for complete search history.

(56) References Cited

U.S. PATENT DOCUMENTS

2014/0036796 A1* 2/2014 Etemad ................. H04W 16/18
370/329
2014/0334333 A1* 11/2014 Xu ..................... H04W 72/0406
370/252

(Continued)

FOREIGN PATENT DOCUMENTS

CN          101848453           9/2010
CN          101938450           1/2011
(Continued)

OTHER PUBLICATIONS

Ericsson, "RRC configuration for CSI-MeasConfig," 3GPP TSG-RAN WG2 Meeting #100 on NR, R2-1713738, Nov. 2017, 13 pages.

(Continued)

*Primary Examiner* — Michael Thier
*Assistant Examiner* — Prince A Mensah
(74) *Attorney, Agent, or Firm* — Hodgson Russ LLP

(57) ABSTRACT

A measurement resource indication method applied to a communication system supporting various signal measurements includes: receiving, by a user device, first measurement resource indication information from a network device, the first measurement resource indication information being used for indicating that a first signal measurement reuses part or all of measurement resources of a second signal measurement; wherein the second signal measurement is a signal measurement configured with the measurement resources, and the first signal measurement is a signal measurement not configured with any measurement resource.

9 Claims, 4 Drawing Sheets

(56) References Cited

U.S. PATENT DOCUMENTS

2015/0171948 A1    6/2015  Xiao et al.
2017/0126300 A1    5/2017  Park et al.

FOREIGN PATENT DOCUMENTS

CN    103458451    12/2013
CN    103580835     2/2014

OTHER PUBLICATIONS

Huawei et al., "Need for new MAC CEs for UL and DL beam management," 3GPP TSG-RAN WG2#100, R2-1712561 (revision of R2-1710562), Nov. 2017, 10 pages.
ZTE Corporation et al., "Discussion on the beam failure recovery impact on RAN2," 3GPP TSG-RAN WG2 Meeting #100, R2-1713954 (revision of R2-1713406), Nov. 2017, 13 pages.
WIPO, ISR for PCT/CN2017/111365, dated Aug. 8, 2018.
EPO, Extended European Search Report for EP Application No. 17932321.7, dated Sep. 18, 2020.

\* cited by examiner

MEASUREMENT RESOURCE INDICATION METHOD AND RELATED DEVICE

CROSS-REFERENCE TO RELATED APPLICATION

This application is a U.S. national phase application of International Application No. PCT/CN2017/111365, filed Nov. 16, 2017, the entire disclosure of which is incorporated herein by reference.

TECHNICAL FIELD

Embodiments of the present application relate to the field of communication, and more particularly, to a measurement resource indication method and related devices.

BACKGROUND

According to the conclusion of the existing 3rd Generation Partnership Project (3GPP), signal measurement may be implemented by using single side band (SSB) or channel state information-reference signal (CSI-RS). Signal measurement includes beam management, radio link measurement (RLM) and radio resource management (RRM). Beam management is mainly used for adding, deleting, and recovering beams, RRM is mainly used for assisting the addition, deletion, and handover of cells, and RLM is mainly used for wireless link monitoring.

User device can perform beam management, RLM and RRM based on SSB or CSI-RS. At present, the measurement resource for beam management, RLM and RRM are usually configured by the network side device through three different radio resource control information elements (RRC IE).

SUMMARY

The embodiments of the present application provide a measurement resource indication method and related devices, which are used for indicating reused measurement resources through a piece of indication information when the same measurement resources are used by different signal measurements, so as to reduce resource waste.

According to a first aspect, embodiments of the present application provide a measurement resource indication method, including:

sending, by a network device, first measurement resource indication information to a user device, the first measurement resource indication information being used for indicating that a first signal measurement reuses part or all of measurement resources of a second signal measurement; wherein the second signal measurement is a signal measurement configured with the measurement resources, and the first signal measurement is a signal measurement not configured with any measurement resource.

According to a second aspect, embodiments of the present application provide a measurement resource indication method, including:

receiving, by a user device, first measurement resource indication information from a network device, the first measurement resource indication information being used for indicating that a first signal measurement reuses part or all of measurement resources of a second signal measurement; wherein the second signal measurement is a signal measurement configured with the measurement resources, and the first signal measurement is a signal measurement not configured with any measurement resource.

According to a third aspect, embodiments of the present application provide a network device, including a processing unit and a communication unit, wherein, the processing unit is configured to sending, through the communication unit, first measurement resource indication information to a user device, the first measurement resource indication information being used for indicating that a first signal measurement reuses part or all of measurement resources of a second signal measurement; wherein the second signal measurement is a signal measurement configured with the measurement resources, and the first signal measurement is a signal measurement not configured with any measurement resource.

According to a fourth aspect, embodiments of the present application provide a user device, including a processing unit and a communication unit, wherein, the processing unit is configured to receive, through the communication unit, first measurement resource indication information from a network device, the first measurement resource indication information being used for indicating that a first signal measurement reuses part or all of measurement resources of a second signal measurement; wherein the second signal measurement is a signal measurement configured with the measurement resources, and the first signal measurement is a signal measurement not configured with any measurement resource.

According to a fifth aspect, embodiments of the present application provide a network device, including one or more processors, one or more memories, one or more transceivers, and one or more programs, wherein the one or more programs are stored in the memories, configured to be executed by the one or more processors, and include instructions for performing steps of the method according to the first aspect.

According to a sixth aspect, embodiments of the present application provide a network device, including one or more processors, one or more memories, one or more transceivers, and one or more programs, wherein the one or more programs are stored in the memories, configured to be executed by the one or more processors, and include instructions for performing steps of the method according to the second aspect.

According to a seventh aspect, embodiments of the present application provide a computer readable storage medium, storing a computer program for electronic data exchange, wherein the computer program causes a computer to execute instructions of steps in the method according to the first aspect.

According to an eighth aspect, embodiments of the present application provide a computer readable storage medium, storing a computer program for electronic data exchange, wherein the computer program causes a computer to execute instructions of steps in the method according to the first aspect.

According to a ninth aspect, embodiments of the present application provide a computer program product, the computer program product includes a non-transitory computer readable storage medium storing a computer program, the computer program is operable to cause a computer to execute some or all of the steps described in the method according to the first aspect. The computer program product may be a software installation package.

According to a tenth aspect, embodiments of the present application provide a computer program product, the computer program product includes a non-transitory computer readable storage medium storing a computer program, the computer program is operable to cause a computer to execute some or all of the steps described in the method according to the second aspect. The computer program product may be a software installation package.

These and other aspects of the present application may become more readily apparent from the following description of the embodiments.

BRIEF DESCRIPTION OF THE DRAWINGS

In order to more clearly explain the technical solutions in the embodiments of the present application or the background, drawings that are needed in the embodiments of the present application or the background will be described below.

DETAILED DESCRIPTION

The terms used in the embodiments of the present application are only used to explain specific examples of the present application, and are not intended to limit the present application.

The terms "first", "second", "third", and "fourth" in the description and claims of the present application and the drawings are used to distinguish different objects, rather than to describe a specific order. Furthermore, the terms "including" and "having", as well as any of them, are intended to cover non-exclusive inclusion.

Figure 1:
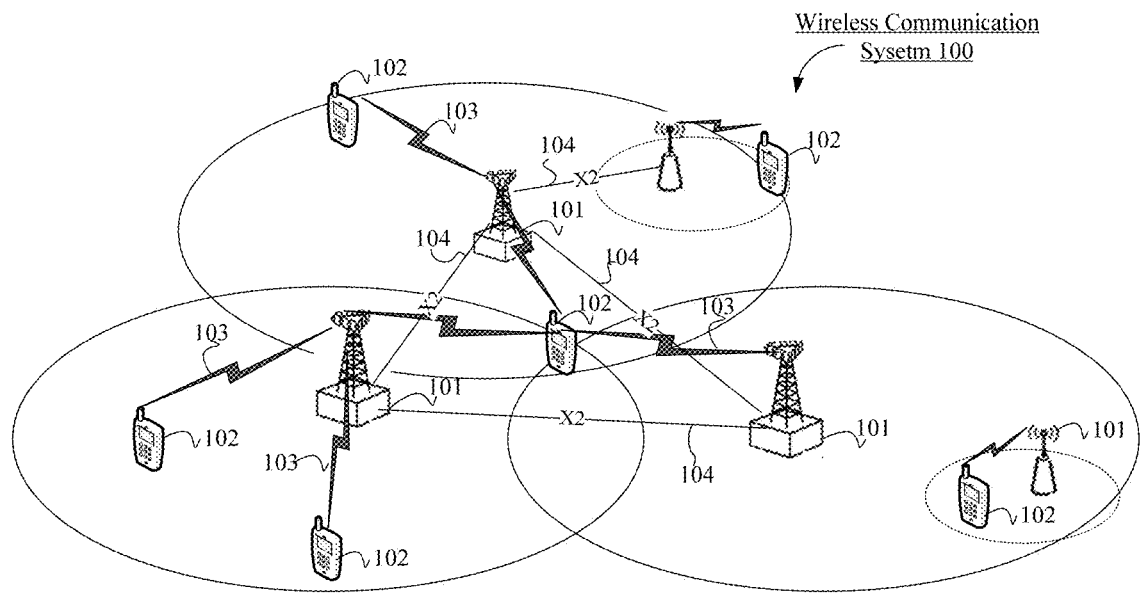
FIG. 1 is a schematic structural diagram of a wireless communication system according to an embodiment of the present application.

FIG. 1 illustrates a wireless communication system involved in the present application. The wireless communication system is not limited to a long term evolution (LTE) system, but may also be a 5th generation (5G) system, a new radio (NR) system, and machine-to-machine (M2M) communication system. As shown in FIG. 1, the wireless communication system 100 may include one or more network devices 101 and one or more user devices 102.

The network device 101 may be a base station, and the base station may be used for communicating with one or more user devices, and may also be used for communicating with one or more base stations with some user device functions (e.g., communication between a macro base station and a micro base station, such as an access point). The base station may be a base transceiver station (BTS) in a time division synchronous code division multiple access (TD-SCDMA) system, or an evolutionary Node B (ENB) in an LTE system, or a base station in 5G system and new radio (NR) system. In addition, the base station may also be an access point (AP), a transmission node (Trans TRP), a central unit (CU), or other network entities, and may include some or all of the functions of the above network entities.

The user device 102 may be distributed throughout the wireless communication system 100, and may be stationary or mobile. In some embodiments of the present application, the terminal 102 may be a mobile device, a mobile station, a mobile unit, a M2M terminal, a wireless unit, a remote unit, a user agent, a mobile client, and so on.

Specifically, the network device 101 may be configured to communicate with the user device 102 through the wireless interface 103 under the control of a network device controller (not shown). In some embodiments, the network device controller may be part of the core network, or may be integrated into the network device 101. The network device 101 and the network device 101 may also communicate with each other directly or indirectly through a backhaul interface 104 (such as an X2 interface).

In order to ensure signal quality and signal stability, signal measurement is required. The signal measurement process is usually that the network device firstly configures measurement resources, and then the network device informs the user device which measurement resources are used for signal measurement, and then the user device performs signal measurement based on the measurement resources configured by the network device. Signal measurements include, but are not limited to, beam management, RLM or RRM.

When performing measurement resource configuration for signal measurement, three different radio resource control information elements (RRC IE) are typically used for configuring the measurement resources for the above three types of signal measurement. For example, RRC IE-1 is used for configuring measurement resources for beam management, RRC IE-2 is used for configuring measurement resources for RLM, and RRC IE-3 is used for configuring measurement resources for RRM.

When the measurement resources used by beam management, RLM, and RRM are completely the same, or when the measurement resources used by beam management, RLM, and RRM are partially the same, waste of resources may be caused by using the above method to configure the measurement resources for beam management, RLM, and RRM.

In the present application, when the first signal measurement is not configured with measurement resources, the second signal measurement is configured with measurement resources, and the network device detects that the first signal measurement reuses measurement resources of the second signal measurement, the network device sends measurement resource indication information to the user device, the measurement resource indication information being used for indicating that the first signal measurement reuses part or all of the measurement resources of the second signal measurement.

It can be seen that when the same measurement resources are used by different signal measurements, the network device indicates reused measurement resources through a piece of indication information, so it is unnecessary to use one RRC IE to configure the measurement resource for each signal measurement, thereby reducing waste of resources.

It should be noted that the wireless communication system 100 shown in FIG. 1 is only for a clearer explanation of the technical solution of the present application, and does not constitute a limitation on the present application. Those skilled in the art may know that with the evolution of network architecture and in the emergence of new service scenarios, the technical solutions provided in this application are also applicable to similar technical problems.

Figure 2:
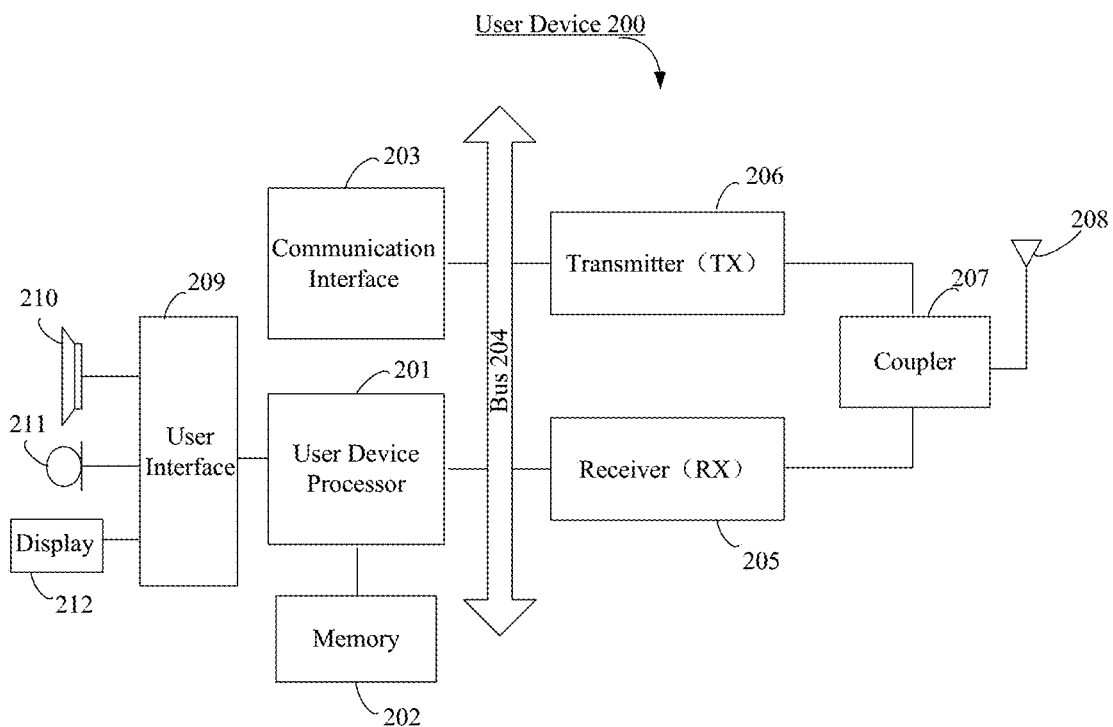
FIG. 2 is a schematic structural diagram of a user device according to an embodiment of the present application.

Referring to FIG. 2, FIG. 2 illustrates a user device 200 provided by some embodiments of the present application.

As shown in FIG. 2, the user device 200 may include one or more user device processors 201, a memory 202, a communication interface 203, a receiver 205, a transmitter 206, a coupler 207, an antenna 208, a user interface 209, and an input output modules (including an audio input output module 210, a key input module 211 and a display 212 and the like). These components may be connected through the bus 204 or in other manners, and the bus connection is taken as an example in FIG. 2.

The communication interface 203 may be used for the user device 200 to communicate with other communication devices, such as a network device. Specifically, the network device may be the network device 300 shown in FIG. 3. Specifically, the communication interface 203 may be a long term evolution (LTE) (4G) communication interface, or a communication interface of 5G or a new radio in the future. Without being limited to a wireless communication interface, the user device 200 may also be configured with a wired communication interface 203, such as a local access network (LAN) interface.

The transmitter 206 may be configured to perform transmission process, such as signal modulation, on a signal output by the user device processor 201. The receiver 205 may be configured to perform receiving process, such as signal demodulation, on a mobile communication signal received by the antenna 208. In some embodiments of the present application, the transmitter 206 and the receiver 205 may be considered as a wireless modem. In the user device 200, the number of the transmitters 206 and the receivers 205 may be one or more. The antenna 208 may be configured to convert electromagnetic energy in a transmission line into electromagnetic waves in a free space, or convert electromagnetic waves in a free space into electromagnetic energy in a transmission line. The coupler 207 is configured to divide the mobile communication signal received by the antenna 308 into multiple channels and distribute the signals to multiple receivers 205.

In addition to the transmitter 206 and the receiver 205 shown in FIG. 2, the user device 200 may further include other communication components, such as a GPS module, a Bluetooth module, a Wireless Fidelity (Wi-Fi) module, and the like. Without being limited to the wireless communication signals described above, the user device 200 may also support other wireless communication signals, such as satellite signals, short-wave signals, and the like. Without being limited to wireless communication, the user device 200 may also be configured with a wired network interface (such as a LAN interface) to support wired communication.

The input output module may be configured to implement interaction between the user device 200 and a user/external environment, and may mainly include an audio input output module 210, a key input module 211, a display 212, and the like. Specifically, the input output module may further include a camera, a touch screen, a sensor, and the like. The input and output module communicates with the user device processor 201 through the user interface 209.

The memory 202 is coupled to the terminal processor 201 and is configured to store various software programs and/or multiple sets of instructions. Specifically, the memory 202 may include a high-speed random access memory, and may also include a non-volatile memory, such as one or more disk storage devices, flash memory devices, or other non-volatile solid-state storage devices. The memory 202 may store an operating system (hereinafter referred to as a system), such as an embedded operating system such as ANDROID, IOS, WINDOWS, or LINUX. The memory 202 may also store a network communication program, which may be used to communicate with one or more additional devices, one or more user devices, and one or more network devices. The memory 202 may also store a user interface program. The user interface program can display the content of the application program realistically through a graphical operation interface, and receive user control operations on the application program through input controls such as menus, dialog boxes, and buttons.

In some embodiments of the present application, the memory 202 may be used for storing an implementation program of the measurement resource indication method provided by one or more embodiments of the present application on the side of user device 200. For implementation of the measurement resource indication method provided by one or more embodiments of this application, the following method embodiments may be referred to.

In some embodiments of the present application, the user device processor 201 may be configured to read and execute computer readable instructions. Specifically, the user device processor 201 may be configured to call a program stored in the memory 202, for example, an implementation program of the measurement resource indication method provided by one or more embodiments of the present application on the side of user device 200, and execute instructions included in the program.

It can be understood that the user device 200 may be implemented as a mobile device, a mobile station, a mobile unit, a wireless unit, a remote unit, a user agent, a mobile client, and so on.

It should be noted that the user device 200 shown in FIG. 2 is only an implementation manner of the embodiment of the present application. In practical applications, the user device 200 may further include more or fewer components, which is not limited herein.

Figure 3:
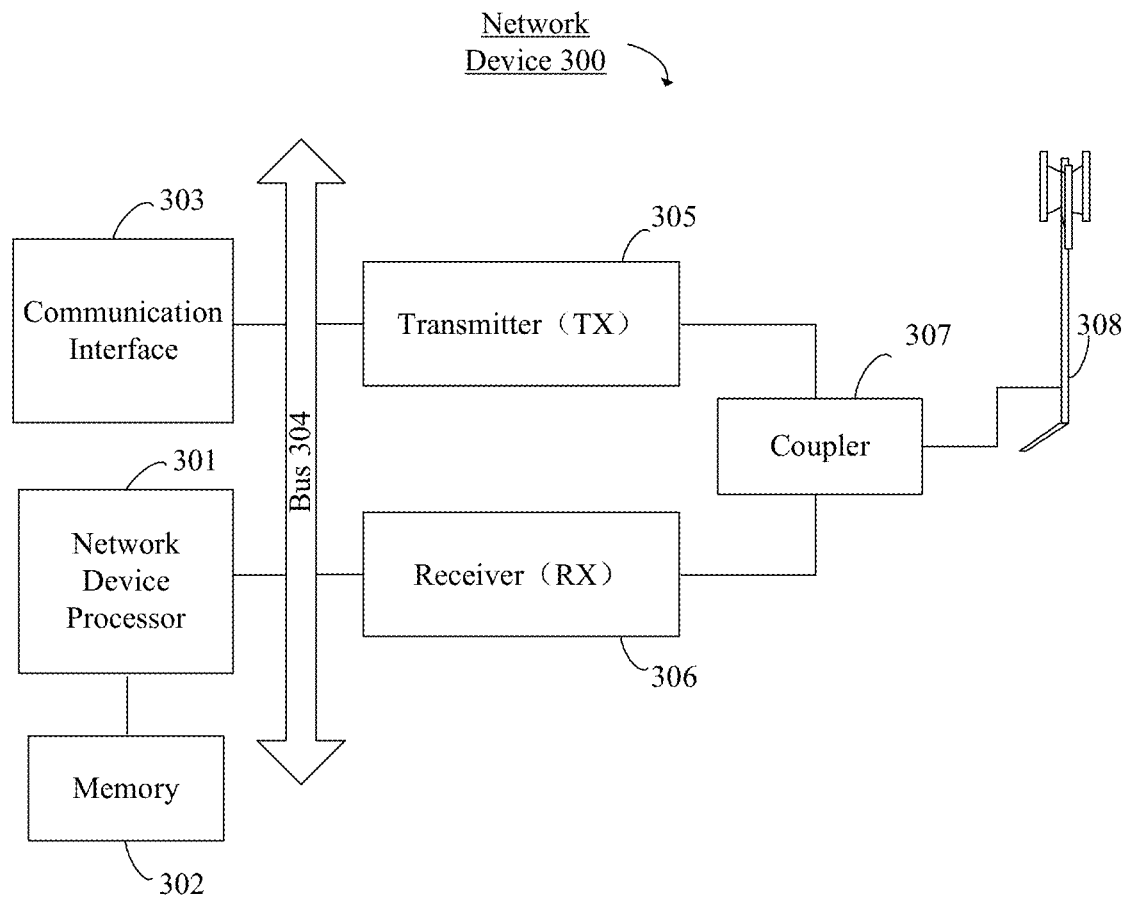
FIG. 3 is a schematic structural diagram of a network device according to an embodiment of the present application.

Referring to FIG. 3, FIG. 3 illustrates a network device 300 provided by some embodiments of the present application. As shown in FIG. 3, the network device 300 may include one or more network device processors 301, a memory 302, a communication interface 303, a transmitter 305, a receiver 306, a coupler 307, and an antenna 308. These components may be connected through the bus 304 or in other types. The bus connection is taken as an example in FIG. 4.

The communication interface 303 may be used for the network device 300 to communicate with other communication devices, such as a user device or another network device. Specifically, the user device may be the user device 200 shown in FIG. 2. Specifically, the communication interface 303 may be a long term evolution (LTE) (4G) communication interface, or a communication interface of 5G or a new radio in the future. Without being limited to a wireless communication interface, the network device 300 may also be configured with a wired communication interface 303 for supporting wired communication. For example, the backhaul link between the network device 300 and another network device 300 may be a wired communication link.

The transmitter 305 may be configured to perform transmission process, such as signal modulation, on a signal output by the network device processor 301. The receiver 306 may be configured to perform receiving process, such as signal demodulation, on a mobile communication signal received by the antenna 308. In some embodiments of the present application, the transmitter 305 and the receiver 306 may be considered as a wireless modem. In the network device 300, the number of the transmitters 305 and the receivers 306 may be one or more. The antenna 308 may be configured to convert electromagnetic energy in a transmission line into electromagnetic waves in a free space, or convert electromagnetic waves in a free space into electromagnetic energy in a transmission line. The coupler 307 is configured to divide the mobile communication signal into multiple channels and distribute the signals to multiple receivers 306.

The memory 302 is coupled to the network device processor 301 and is configured to store various software programs and/or multiple sets of instructions. Specifically, the memory 302 may include a high-speed random access memory, and may also include a non-volatile memory, such as one or more disk storage devices, flash memory devices, or other non-volatile solid-state storage devices. The memory 302 may store an operating system (hereinafter referred to as a system), for example, an embedded operating system such as uCOS, VxWorks, and RTLinux. The memory 402 may also store a network communication program, which can be used for communicating with one or more additional devices, one or more terminal devices, and one or more network devices.

The network device processor 301 may be used for performing wireless channel management, implementing call as well as establishment and removal of communication link, and providing cell switching control for users in the control area. Specifically, the network device processor 301 may include: an administration module/communication module (AM/CM, a center for voice path exchange and information exchange), a basic module (BM, for implementing call processing, signaling processing, wireless resource management, wireless link management and circuit maintenance functions), transcoder and submultiplexer (TCSM, for implementing multiplexing, demultiplexing and code conversion functions) and the like.

In some embodiments of the present application, the memory 302 may be configured to store an implementation program of the measurement resource indication method provided by one or more embodiments of the present application on the side of network device 300. For implementation of the measurement resource indication method provided by one or more embodiments of this application, the following method embodiments may be referred to.

In the embodiment of the present application, the network device processor 301 may be configured to read and execute computer readable instructions. Specifically, the network device processor 301 may be used for calling a program stored in the memory 302, for example, the implementation program of the measurement resource indication method provided by one or more embodiments of the present application on the side of network device 300, and executing instructions included in the program.

It can be understood that the network device 300 may be implemented as a base transceiver station, a wireless transceiver, a basic service set (BSS), an extended service set (ESS), a NodeB, an eNodeB, an access point, a TRP, and the like.

It should be noted that the network device 300 shown in FIG. 3 is only an implementation manner of the embodiment of the present application. In actual applications, the network device 300 may further include more or fewer components, which is not limited herein.

Based on the foregoing corresponding embodiments of the wireless communication system 100, the user device 200, and the network device 300, a measurement resource indication method is provided by embodiments of the present application.

Figure 4:
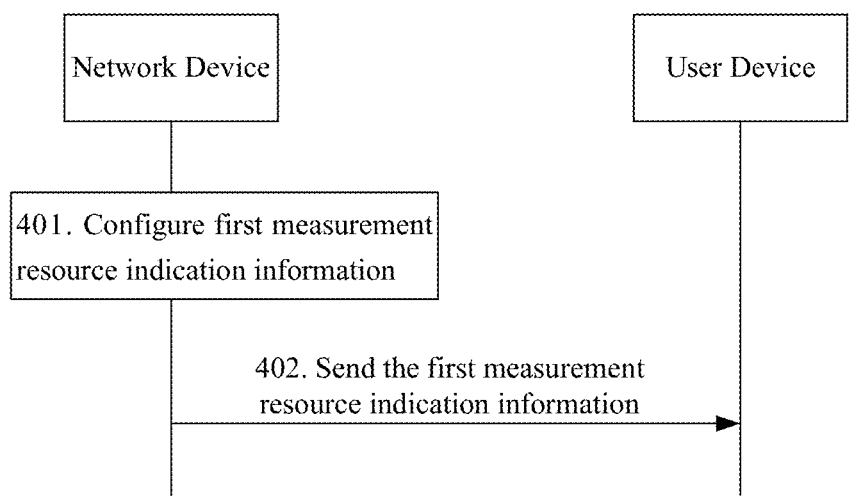
FIG. 4 is a schematic flowchart of a measurement resource indication method according to an embodiment of the present application.

Referring to FIG. 4, FIG. 4 is a schematic flowchart of a measurement resource indication method according to an embodiment of the present application, which is applied to a communication system supporting multiple signal measurements, and includes the following steps.

In step 401, the network device configures first measurement resource indication information, and the first measurement resource indication information is used for indicating that a first signal measurement reuses part or all of measurement resources of a second signal measurement; wherein the second signal measurement is a signal measurement configured with the measurement resources, and the first signal measurement is a signal measurement not configured with any measurement resource.

In step 401, the network device sends the first measurement resource indication information to the user device; and the user device receives the first measurement resource indication information from the network device.

In an embodiment, the signal measurement includes, but is not limited to, beam management, RLM, or RRM.

In an embodiment, the measurement resources include, but are not limited to, SSB or CSI-RS.

In an embodiment, the measurement resource indication information may be carried in the RRC IE, or may be carried in signaling sent by the network device to the user device, or may be carried in downlink data sent by the network device to the user device, which is not limited herein.

In some embodiments of the present application, when the first signal measurement reuses the measurement resource of the second signal measurement, the network device configures the first measurement resource indication information.

In some embodiments of the present application, after the user device receives the first measurement resource indication information from the network device, the user device performs the first signal measurement by using part of the measurement resources or all the measurement resources of the second signal measurement. For example, assuming that the second signal measurement is beam management, the first signal measurement is RLM, and the first measurement resource indication information indicates that RLM reuses all measurement resources of the beam management. In this way, after the user device receives the first measurement resource indication information, the user device performs RLM by using all measurement resources of the beam management.

In some embodiments of the present application, when the number of second signal measurement is 1 and the number of first signal measurement is equal to 1, the first measurement resource indication information is used for indicating that the first signal measurement reuses the measurement resource of the second signal measurement. For example, assuming that the second signal measurement is beam management and the first signal measurement is RLM, the first measurement resource indication information is used for indicating that RLM reuses the measurement resource of the beam management.

In some embodiments of the present application, when the number of second signal measurement is 1, the number of first signal measurement is greater than 1, and the plurality of first signal measurements reuse the same measurement resources of the second signal measurement, the first measurement resource indication information is used for indicating that the plurality of first signal measurements reuse the measurement resources of the second signal measurement. For example, assuming that the second signal measurement is beam management and the first signal measurements are RLM and RRM, the RLM and RRM reuse the same measurement resources of the beam management, then the first measurement resource indication information is used for indicating that the RLM and RRM reuse measurement resources of the beam management.

It should be noted that when the number of second signal measurements is 1, the number of first signal measurements is greater than 1, and the plurality of first signal measurements reuse different measurement resources of the second signal measurement, the network device configures multiple pieces of measurement resource indication information, and the multiple pieces of measurement resource indication information correspond to the plurality of first signal measurements one-to-one. For example, assuming that the second signal measurement is beam management and the first signal measurements are RLM and RRM, and the RLM and RRM reuse different measurement resources of the beam management, then the network device may configured 2 pieces of measurement resource indication information, one piece of the measurement resource indication information is used for indicating the situation of RLM reusing beam management, and another piece of measurement resource indication information is used for indicating the situation of RRM reusing beam management.

For example, assuming that the second signal measurement is beam management, the measurement resources of beam management are resource 1, resource 2, and resource 3, and the first signal measurements are RLM and RRM. If the network device is to set resources 1 and 3 being reused by RLM and RRM, the network device sends measurement resource indication information for indicating that both RLM and RRM reuse resources 1 and 3. If the network device is to set resources 1 and 3 being reused by RLM and reuse resources 1 and 2 being reused by RRM, then the network device sends a measurement resource indication information for indicating that RLM reuses resources 1 and 3, and the network device sends another measurement resource indication information for indicating that RRM reuses resource 1 and resource 2.

It can be seen that when different signal measurements use the same measurement resources, the network device indicates a reused measurement resource through an instruction information, so it is unnecessary to use one RRC IE to configure the measurement resource for each signal measurement, thereby reducing waste of resources.

In some embodiments of the present application, when the first signal measurement reuses all measurement resources of the second signal measurement, the first measurement resource indication information includes a first bit, and the first bit is used for indicating that the first signal measurement reuses all measurement resources of the second signal measurement. For example, assuming that the second signal measurement is beam management, the measurement resources for beam management are resource 1, resource 2, and resource 3, and the first signal measurements are RLM and RRM. If the network device is to set resource 1, resource 2 and resource 3 being used by RLM and RRM, in this case, the first measurement resource indication information may include 1 bit, for example, the value of this bit is 1, which means that both RLM and RRM reuse all measurement resources of the beam management.

In some embodiments of the present application, when the first signal measurement reuses part of the measurement resources of the second signal measurement, the first measurement resource indication information includes at least 2 bits, each bit corresponds to a measurement resource of the second signal measurement, and each bit is used for indicating that the first signal measurement reuses the measurement resource corresponding thereto, or indicating that the first signal measurement does not reuse the measurement resource corresponding thereto. For example, assuming that the second signal measurement is beam management, the measurement resources of beam management are resource 1, resource 2, and resource 3, and the first signal measurements are RLM and RRM. If the network device is to set resources 1 and 3 being used by RLM and RRM, in this case, the first measurement resource indication information may include 3 bits, which correspond to resource 1, resource 2 and resource 3 respectively. The values of these three bits are 1, 0, and 1, respectively, indicating that RLM and RRM reuse resources 1 and 3, and do not reuse resource 2.

In some embodiments of the present application, when the number of the second signal measurements is multiple, the method further includes:

sending, by the network device, second measurement resource indication information to the user device, the second measurement resource indication information including a second bit, the second bit being used for indicating that the first signal measurement reuses a measurement resource of a signal measurement i, wherein the signal measurement i is one of the plurality of the second signal measurements.

In an embodiment, the time at which the first measurement resource instruction information is sent may the same as or different from the time at which the second measurement resource instruction information is sent, which is not limited herein.

Specifically, there are a plurality of second signal measurements, the user device does not know which second signal measurement resource is reused by the first signal measurement based on the first measurement resource indication information, so the network device needs to inform the user device, through the second measurement resource indication information, on measurement resources of which second signal measurement are reused by the first signal measurement.

For example, assuming that the second signal measurements are beam management and RRM and the first signal measurement is RLM, the second measurement resource indication information includes 1 bit. When the value of this bit is 1, it indicates that the beam management is reused; when the value of this bit is 0, it indicates that RRM is reused. Assuming that the first measurement resource indication information currently received by the user device includes 1 bit and the value of this bit is 1, the second measurement resource indication information as received includes 1 bit and the value of this bit is 1, the user device may know, based on the first measurement resource indication information and the second measurement resource indication information, that RLM reuses all measurement resources of the beam management.

For another example, assuming that the second signal measurements are beam management and RRM, the measurement resources of beam management include resource 1, resource 2, and resource 3, the measurement resources of RRM include resource 4 and resource 5, the first signal measurement is RLM and the second measurement resource indication information includes one bit; when the value of this bit is 1, it indicates that the beam management is reused; and when the value of this bit is 0, it indicates that the RRM is reused. Assuming that the first measurement resource indication information currently received by the user device includes 3 bits, and the values of the three bits are 1, 0 and 1, and the received second measurement resource indication information includes 1 bit, and the value of this bit is 1, then the user device may know, based on the first measurement resource indication information and the second measurement resource indication information, that RLM reuses resource 1 and resource 3 of the beam management, and does not reuse resource 2.

Figure 5:
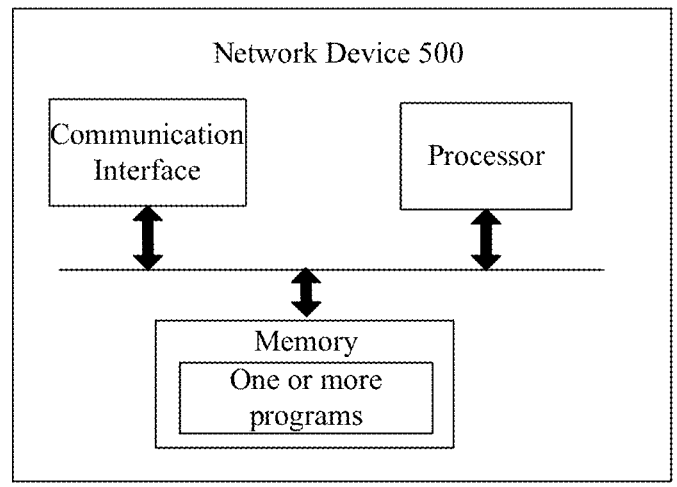
FIG. 5 is a block diagram of a network device according to an embodiment of the present application.

Refer to FIG. 5. FIG. 5 illustrates a network device 500 provided in an embodiment of the present application, which is applied to a communication system supporting multiple signal measurements. The network device 500 includes: one or more processors, one or more memories, one or more communication interfaces, and one or more programs.

The one or more programs are stored in the memory and configured to be executed by the one or more processors.

The program includes instructions for performing the following steps:

sending first measurement resource indication information to a user device, the first measurement resource indication information being used for indicating that a first signal measurement reuses part or all of measurement resources of a second signal measurement; wherein the second signal measurement is a signal measurement configured with the measurement resources, and the first signal measurement is a signal measurement not configured with any measurement resource.

In some embodiments of the present application, when the first signal measurement reuses all of the measurement resources of the second signal measurement, the first measurement resource indication information includes a first bit, the first bit being used for indicating that the first signal measurement reuses all of the measurement resources of the second signal measurement.

In some embodiments of the present application, when the first signal measurement reuses part of the measurement resources of the second signal measurement, the first measurement resource indication information includes at least 2 bits, each bit corresponding to one of the measurement resources of the second signal measurement, each bit being used for indicating that the first signal measurement reuses a corresponding measurement resource, or indicating that the first signal measurement does not reuse the corresponding measurement resource.

In some embodiments of the present application, when there are a plurality of the second signal measurements, the program includes instructions that are further used for executing the following steps:

sending second measurement resource indication information to the user device, the second measurement resource indication information including a second bit, the second bit being used for indicating that the first signal measurement reuses a measurement resource of a signal measurement i, wherein the signal measurement i is one of the plurality of the second signal measurements.

It should be noted that, for a specific implementation manner of the content described in this embodiment, reference may be made to the foregoing method, and details are not described herein again.

Figure 6:
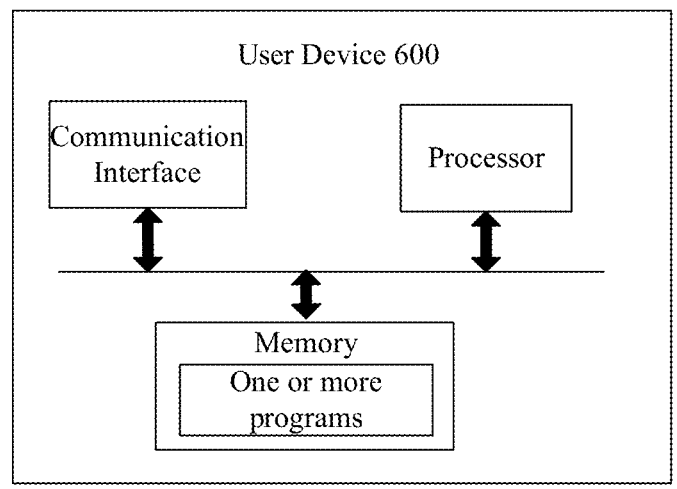
FIG. 6 is a block diagram of a user device according to an embodiment of the present application.

Refer to FIG. 6. FIG. 6 illustrates a user device 600 provided in an embodiment of the present application, which is applied to a communication system supporting multiple signal measurements. The user device 600 includes: one or more processors, one or more memories, one or more communication interfaces, and one or more programs.

The one or more programs are stored in the memory and configured to be executed by the one or more processors.

The program includes instructions for performing the following steps:

receiving first measurement resource indication information from a network device, the first measurement resource indication information being used for indicating that a first signal measurement reuses part or all of measurement resources of a second signal measurement; wherein the second signal measurement is a signal measurement configured with the measurement resources, and the first signal measurement is a signal measurement not configured with any measurement resource.

In some embodiments of the present application, when the first signal measurement reuses all of the measurement resources of the second signal measurement, the first measurement resource indication information includes a first bit, the first bit being used for indicating that the first signal measurement reuses all of the measurement resources of the second signal measurement.

In some embodiments of the present application, when the first signal measurement reuses part of the measurement resources of the second signal measurement, the first measurement resource indication information includes at least 2 bits, each bit corresponding to one of the measurement resources of the second signal measurement, each bit being used for indicating that the first signal measurement reuses a corresponding measurement resource, or indicating that the first signal measurement does not reuse the corresponding measurement resource.

In some embodiments of the present application, when there are a plurality of the second signal measurements, the program includes instructions that are further used for executing the following steps:

receiving second measurement resource indication information from the network device, the second measurement resource indication information including a second bit, the second bit being used for indicating that the first signal measurement reuses a measurement resource of a signal measurement i, wherein the signal measurement i is one of the plurality of the second signal measurements.

It should be noted that, for a specific implementation manner of the content described in this embodiment, reference may be made to the foregoing method, and details are not described herein again.

Figure 7:
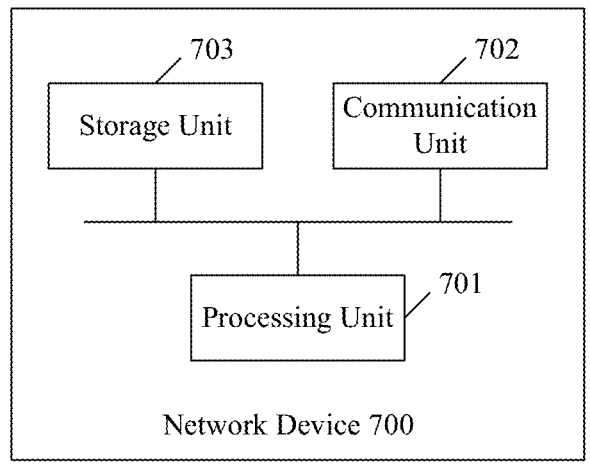
FIG. 7 is a block diagram of another network device according to an embodiment of the present application.

Referring to FIG. 7, FIG. 7 illustrates a network device 700 provided in an embodiment of the present application, which is applied to a communication system supporting multiple signal measurements. The network device 700 includes a processing unit 701, a communication unit 702 and a storage unit 703.

The processing unit 701 is configured to sending, through the communication unit 702, first measurement resource indication information to a user device, the first measurement resource indication information being used for indicating that a first signal measurement reuses part or all of measurement resources of a second signal measurement; wherein the second signal measurement is a signal measurement configured with the measurement resources, and the first signal measurement is a signal measurement not configured with any measurement resource.

In some embodiments of the present application, when the first signal measurement reuses all of the measurement resources of the second signal measurement, the first measurement resource indication information includes a first bit, the first bit being used for indicating that the first signal measurement reuses all of the measurement resources of the second signal measurement.

In some embodiments of the present application, when the first signal measurement reuses part of the measurement resources of the second signal measurement, the first measurement resource indication information includes at least 2 bits, each bit corresponding to one of the measurement resources of the second signal measurement, each bit being used for indicating that the first signal measurement reuses a corresponding measurement resource, or indicating that the first signal measurement does not reuse the corresponding measurement resource.

In some embodiments of the present application, when there are a plurality of the second signal measurements, the processing unit 701 is further configured to send, through the communication unit 702, second measurement resource indication information to the user device, the second measurement resource indication information including a second bit, the second bit being used for indicating that the first signal measurement reuses a measurement resource of a signal measurement i, wherein the signal measurement i is one of the plurality of the second signal measurements.

The processing unit 701 may be a processor or a controller. For example, it may be a Central Processing Unit (CPU), a general-purpose processor, a digital signal processor (DSP), an Application-Specific Integrated Circuit (ASIC), a Field Programmable Gate Array (FPGA), or other programmable logic device, transistor logic device, hardware component, or any combination thereof. It may implement or execute various exemplary logical blocks, modules, and circuits as described in connection with the disclosure of this application. The processor may also be a combination that implements computing functions, such as a combination of one or more microprocessors, a combination of a DSP, a microprocessor, and the like. The communication unit 702 may be a transceiver, a transceiver circuit, a radio frequency chip, a communication interface, and the like, and the storage unit 703 may be a memory.

When the processing unit 701 is a processor, the communication unit 702 is a communication interface, and the storage unit 703 is a memory, the network device involved in this embodiment of the present application may be the network device as shown in FIG. 5.

Figure 8:
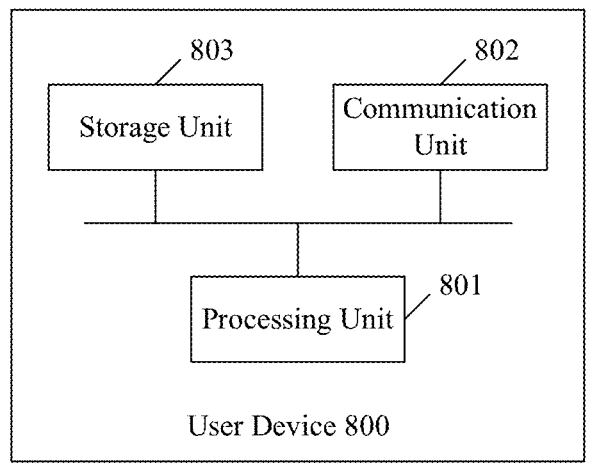
FIG. 8 is a block diagram of another network device according to an embodiment of the present application.

Referring to FIG. 8, FIG. 8 illustrates a user device 800 provided in an embodiment of the present application, which is applied to a communication system supporting multiple signal measurements. The user device 800 includes a processing unit 801, a communication unit 802 and a storage unit 803.

The processing unit 801 is configured to receive, through the communication unit 802, first measurement resource indication information from a network device, the first measurement resource indication information being used for indicating that a first signal measurement reuses part or all of measurement resources of a second signal measurement; wherein the second signal measurement is a signal measurement configured with the measurement resources, and the first signal measurement is a signal measurement not configured with any measurement resource.

In some embodiments of the present application, when the first signal measurement reuses all of the measurement resources of the second signal measurement, the first measurement resource indication information includes a first bit, the first bit being used for indicating that the first signal measurement reuses all of the measurement resources of the second signal measurement.

In some embodiments of the present application, when the first signal measurement reuses part of the measurement resources of the second signal measurement, the first measurement resource indication information includes at least 2 bits, each bit corresponding to one of the measurement resources of the second signal measurement, each bit being used for indicating that the first signal measurement reuses a corresponding measurement resource, or indicating that the first signal measurement does not reuse the corresponding measurement resource.

In some embodiments of the present application, when there are a plurality of the second signal measurements, the processing unit 801 is further configured to receive, through the communication unit 802, second measurement resource indication information from the network device, the second measurement resource indication information including a second bit, the second bit being used for indicating that the first signal measurement reuses a measurement resource of a signal measurement i, wherein the signal measurement i is one of the plurality of the second signal measurements.

The processing unit 801 may be a processor or a controller. For example, it may be a Central Processing Unit (CPU), a general-purpose processor, a digital signal processor (DSP), an Application-Specific Integrated Circuit (ASIC), a Field Programmable Gate Array (FPGA), or other programmable logic device, transistor logic device, hardware component, or any combination thereof. It may implement or execute various exemplary logical blocks, modules, and circuits as described in connection with the disclosure of this application. The processor may also be a combination that implements computing functions, such as a combination of one or more microprocessors, a combination of a DSP, a microprocessor, and the like. The communication unit 802 may be a transceiver, a transceiver circuit, a radio frequency chip, a communication interface, and the like, and the storage unit 803 may be a memory.

When the processing unit 801 is a processor, the communication unit 802 is a communication interface, and the storage unit 803 is a memory, the user device involved in this embodiment of the present application may be the user device as shown in FIG. 6.

An embodiment of the present application further provides a computer-readable storage medium, wherein the computer-readable storage medium stores a computer program for electronic data exchange, and the computer program causes a computer to execute part or all of the steps as described in the foregoing method embodiments involved with the network device.

An embodiment of the present application further provides a computer-readable storage medium, wherein the computer-readable storage medium stores a computer program for electronic data exchange, and the computer program causes a computer to execute part or all of the steps as described in the foregoing method embodiments involved with the user device.

An embodiment of the present application further provides a computer program product, wherein the computer program product includes a non-transitory computer-readable storage medium storing a computer program, and the computer program is operable to cause a computer to execute part or all of the steps as described in the foregoing method embodiments involved with the network device. The computer program product may be a software installation package.

An embodiment of the present application further provides a computer program product, wherein the computer program product includes a non-transitory computer-readable storage medium storing a computer program, and the computer program is operable to cause a computer to execute part or all of the steps as described in the foregoing method embodiments involved with the user device. The computer program product may be a software installation package.

The steps of the method or algorithm described in the embodiments of the present application may be implemented by hardware, or may be implemented by a processor executing software instructions. Software instructions may be composed of corresponding software modules, which may be stored in Random Access Memory (RAM), flash memory, Read Only Memory (ROM), Erasable Programmable ROM (EPROM), Electrically Erasable Programmable Read-Only Memory (EPROM), registers, hard drives, removable hard drives, CD-ROMs, or any other form of storage medium known in the art. An exemplary storage medium is coupled to the processor such that the processor can read information from, and write information to, the storage medium. Optionally, the storage medium may also be an integral part of the processor. The processor and the storage medium may reside in an ASIC. In addition, the ASIC may be located in an access network device, a target network device, or a core network device. Optionally, the processor and the storage medium may also exist as discrete components in an access network device, a target network device, or a core network device.

Those skilled in the art should be aware that, in one or more of the above examples, the functions described in the embodiments of the present application may be implemented in whole or in part by software, hardware, firmware, or any combination thereof. When implemented in software, it may be implemented in whole or in part in the form of a computer program product. The computer program product includes one or more computer instructions. When the computer program instructions are loaded and executed on a computer, all or part of the processes or functions according to the embodiments of the present application may be generated. The computer may be a general-purpose computer, a special-purpose computer, a computer network, or other programmable devices. The computer instructions may be stored in a computer-readable storage medium or transmitted from one computer-readable storage medium to another computer-readable storage medium. For example, the computer instructions may be transmitted from a website site, computer, server, or data center in a wired way (such as coaxial cable, optical fiber, Digital Subscriber Line (DSL)) or a wireless way (such as infrared, wireless, microwave and the like) to another website site, computer, server, or data center. The computer-readable storage medium may be any available medium that can be accessed by a computer or a data storage device such as a server, a data center, and the like that includes one or more available medium integration. The available medium may be a magnetic medium (for example, a floppy disk, a hard disk, a magnetic tape), an optical medium (for example, a Digital Video Disc (DVD)), a semiconductor medium (for example, a Solid State Disk (SSD)) and the like.

The specific implementation manners described above further describe the objectives, technical solutions, and beneficial effects of the embodiments of the present application. It should be understood that the foregoing descriptions are merely specific implementation manners of the embodiments of the present application, and are not used for limiting protection scope of the embodiments of the present application. Any modification, equivalent replacement, or improvement based on the technical solution of the embodiments of the present application shall fall within the protection scope of the embodiments of the present application.

What is claimed is:

1. A measurement resource indication method, applied to a communication system supporting various signal measurements, comprising:

receiving, by a user device, first measurement resource indication information from a network device, the first measurement resource indication information being used for indicating that a first signal measurement reuses part or all of measurement resources of a second signal measurement; wherein the second signal measurement is a signal measurement configured with the measurement resources, and the first signal measurement is a signal measurement not configured with any measurement resource;

wherein, the second signal measurement comprises at least two measurements of beam management, radio link measurement (RLM), and radio resource management (RRM), the first signal measurement is different from any of the at least two measurements, and the method further comprises:

receiving, by the user device, second measurement resource indication information from the network device, the second measurement resource indication information including a second bit;

determining, in response to the second bit being a first value, the first signal measurement reuses a measurement resource of one of the at least two measurements; and determining, in response to the second bit being a second value, the first signal measurement reuses a measurement resource of another one of the at least two measurements.

2. The method according to claim 1, wherein, when the first signal measurement reuses all of the measurement resources of the second signal measurement, the first measurement resource indication information includes a first bit, the first bit being used for indicating that the first signal measurement reuses all of the measurement resources of the second signal measurement.

3. The method according to claim 1, wherein, when the first signal measurement reuses part of the measurement resources of the second signal measurement, the first measurement resource indication information includes at least 2 bits, each bit corresponding to one of the measurement resources of the second signal measurement, each bit being used for indicating that the first signal measurement reuses a corresponding measurement resource, or indicating that the first signal measurement does not reuse the corresponding measurement resource.

4. A network device, applied to a communication system supporting various signal measurements, comprising a processor and a transceiver, wherein, the processor is configured to sending, through the transceiver, first measurement resource indication information to a user device, the first measurement resource indication information being used for indicating that a first signal measurement reuses part or all of measurement resources of a second signal measurement; wherein the second signal measurement is a signal measurement configured with the measurement resources, and the first signal measurement is a signal measurement not configured with any measurement resource;

wherein, the second signal measurement comprises at least two measurements of beam management, radio link measurement (RLM), and radio resource management (RRM), the first signal measurement is different from any of the at least two measurements, and the processor is further configured to:

send, through the transceiver, second measurement resource indication information to the user device, the second measurement resource indication information including a second bit, wherein the second bit taking a first value is used for indicating that the first signal measurement reuses a measurement resource of one of the at least two measurements, and the second bit taking a second value is used for indicating that the first signal measurement reuses a measurement resource of another one of the at least two measurements.

5. The network device according to claim 4, wherein, when the first signal measurement reuses all of the measurement resources of the second signal measurement, the first measurement resource indication information includes a first bit, the first bit being used for indicating that the first signal measurement reuses all of the measurement resources of the second signal measurement.

6. The network device according to claim 4, wherein, when the first signal measurement reuses part of the measurement resources of the second signal measurement, the first measurement resource indication information includes at least 2 bits, each bit corresponding to one of the measurement resources of the second signal measurement, each bit being used for indicating that the first signal measurement reuses a corresponding measurement resource, or indicating that the first signal measurement does not reuse the corresponding measurement resource.

7. A user device, applied to a communication system supporting various signal measurements, comprising a processor and a transceiver, wherein, the processor is configured to receive, through the transceiver, first measurement resource indication information from a network device, the first measurement resource indication information being used for indicating that a first signal measurement reuses part or all of measurement resources of a second signal measurement; wherein the second signal measurement is a signal measurement configured with the measurement resources, and the first signal measurement is a signal measurement not configured with any measurement resource;

wherein, the second signal measurement comprises at least two measurements of beam management, radio link measurement (RLM), and radio resource management (RRM), the first signal measurement is different from any of the at least two measurements, and the processor is further configured to:

receive, through the transceiver, second measurement resource indication information from the network device, the second measurement resource indication information including a second bit;

determine, in response to the second bit being a first value, the first signal measurement reuses a measurement resource of one of the at least two measurements; and determine, in response to the second bit being a second value, the first signal measurement reuses a measurement resource of another one of the at least two measurements.

8. The user device according to claim 7, wherein, when the first signal measurement reuses all of the measurement resources of the second signal measurement, the first measurement resource indication information includes a first bit, the first bit being used for indicating that the first signal measurement reuses all of the measurement resources of the second signal measurement.

9. The user device according to claim 7, wherein, when the first signal measurement reuses part of the measurement resources of the second signal measurement, the first measurement resource indication information includes at least 2 bits, each bit corresponding to one of the measurement resources of the second signal measurement, each bit being used for indicating that the first signal measurement reuses a corresponding measurement resource, or indicating that the first signal measurement does not reuse the corresponding measurement resource.

* * * * *